Feb. 25, 1969  W. R. J. BROWN  3,429,982
SINTERED COAXIAL CABLE
Filed March 2, 1967

Inventor:
Walter R. J. Brown,
by Gordon Needleman
Att'y.

United States Patent Office 3,429,982
Patented Feb. 25, 1969

1

3,429,982
SINTERED COAXIAL CABLE
Walter R. J. Brown, Lexington, Mass., assignor, by mesne assignments, to United-Carr Incorporated, Boston, Mass., a corporation of Delaware
Continuation-in-part of application Ser. No. 449,741, Apr. 21, 1965. This application Mar. 2, 1967, Ser. No. 620,089
U.S. Cl. 174—102            2 Claims
Int. Cl. H01b 7/18, 7/00

ABSTRACT OF THE DISCLOSURE

This is a coaxial cable and a method of forming same which utilizes a sintered or unsintered thread wrapped about the inner conductor. The thread then has an unsintered tape wrapped about it and the whole assembly is then sintered to form a convoluted external surface.

Background of the invention

This is a continuation-in-part of application, Ser. No. 449,741, filed Apr. 21, 1965, now abandoned.

An object of the present invention is to provide a means of forming a coaxial cable presenting a sinuous curve in cross section utilizing threads formed of a polymeric material.

Another object of the present invention is to provide a method of forming a convoluted coaxial cable using a thread or tape of sintered material wrapped about a core and then having a sheet of unsintered material wrapped about the surface provided by the threaded material and then fixing the external sheet by, for instance, sintering.

Another object of the present invention is to provide a coaxial cable having an inner portion formed of sintered threaded or tape material and an external surface forming a sintered convoluted substrate.

One of the difficulties with forming a convoluted coaxial cable is the formation of the convolutions. It is highly desirable to provide some means of forming the cable which will set up a built-in mechanism for providing the convolutions within the cable itself rather than utilizing secondary machining operations.

Other objects of the invention will, in part, be obvious and will, in part, appear hereinafter.

Description of the preferred embodiment

Figure 1:
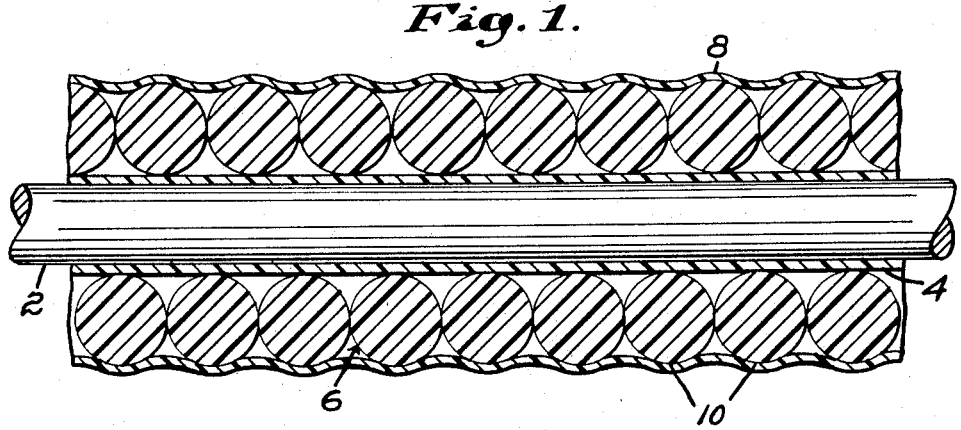
FIG. 1 is a cross section of a portion of a coaxial cable prior to the second sintering operation.
Figure 2:
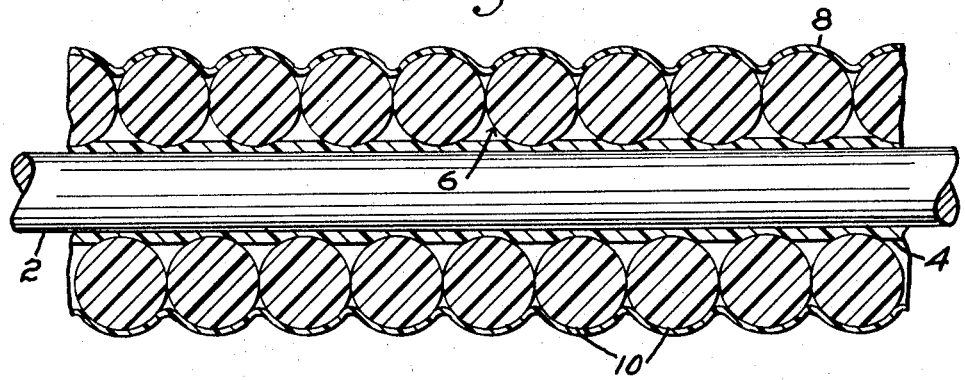
FIG. 2 is a section of the coaxial cable after the second sintering operation.
Figure 3:
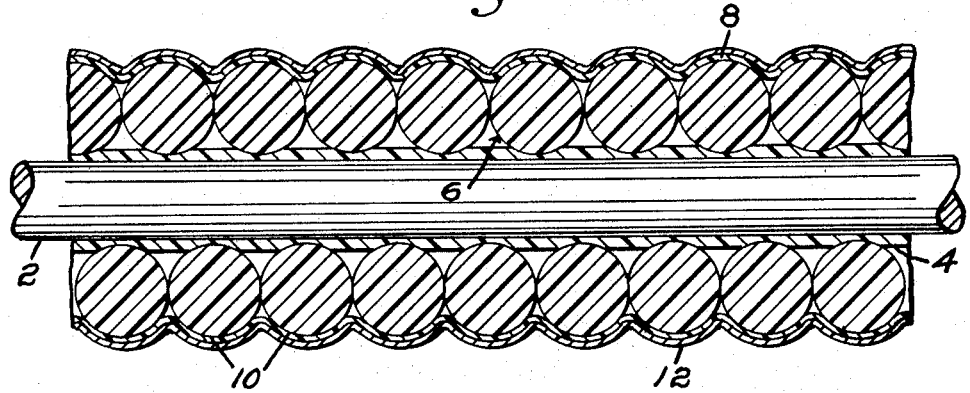
FIG. 3 is a section of the coaxial cable after the plating operation.
Figure 4:
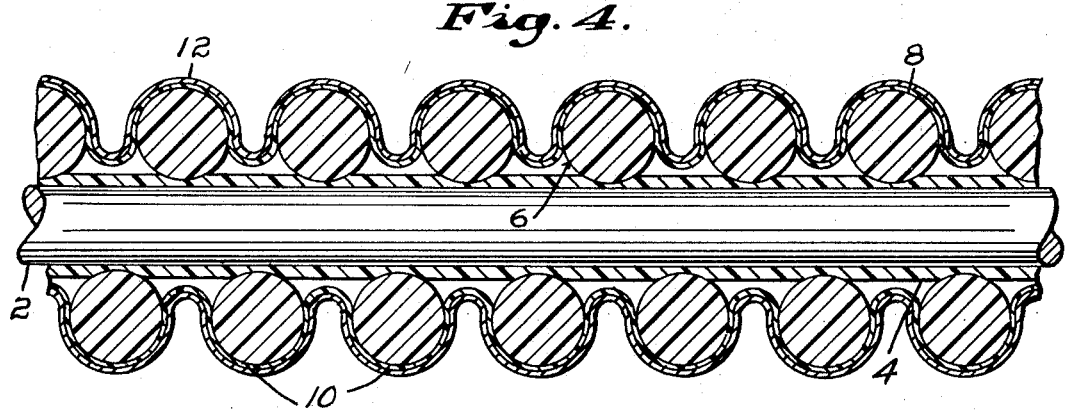
FIG. 4 is a variation of the cable as shown in FIGS. 1 through 3 in which the convolutions of the sintered thread are spaced from each other.

In the drawings in FIGS. 1 through 3 there is shown a coaxial cable comprising an inner conductor or core 2 which is coated or which is wrapped on its external surface with a sheet or tape of tetrafluoroethylene fluorocarbon material 4. This first coat 4 has been preformed but has not been sintered. A thread or tape 6 is wrapped about the first coat. The threads 6 may be tightly wrapped so that each convolution is in abutting relationship or may, as shown in FIG. 4, be spaced apart so that the wrapping about the first coat 4 is fairly tight but the distance between the convolutions of the threads 6 is greater than that shown in FIGS. 1 through 3. The thread or tape 6 is formed of a sintered tetrafluoroethylene fluorocarbon, such as "Teflon" (TFE) which has already passed through a sintering process and which is, therefore, stable insofar as reapplication of heat, within limits, is concerned. A second coat of tape of "Teflon" (TFE) 8 is now applied over the outer surface 10 of the thread 6. The coat 8 is in abutting relation with the surface of threads 6 most remote from the core 2 as shown in FIG. 1. The second coat 8, is also formed of an unsintered "Teflon" (TFE). Due to the stretching of the tape 8, as it is wrapped over the thread 6, it will conform somewhat to the threads 6, and a slightly convoluted external surface will result. The total assembly of the first and second coats 4, 8, the thread 6, and the inner conductor 2, are now passed through a sintering oven which will bring the assembly to a sintering temperature in the range of 360°–400° C. It appears that during the sintering process the unsintered parts will first expand and will then pass through a period of coalescence. The two stages that the unsintered material passes through during the sintering operation will cause the threads 8, to indent the first coat 4, and adhere to the first coat 4, while the second coat 8, will collapse down into the spaces between the convolutions of the thread 6, thus creating a convoluted external surface. If the individual convolutions of the thread 6, are spaced from each other as shown in FIG. 4, then the second coat 8, will create deeper threads whose walls are in substantially spaced parallel relationship, which configuration is of a higher electrical efficiency than that shown in FIGS. 1 through 3 as well as being of higher mechanical efficiency in providing greater flexibility for bending. The second coat 8 is then plated with a conductive material to form an outer conductor 12.

It is also possible to utilize threads of tape which are unsintered. The same procedures would be utilized except that the advantage of the first coat 4, around the core would be negated since, when the assembly is subjected to heat in the sintering process, the tape would adhere to the core directly.

Of course, air is an excellent dielectric and it has been discovered that the use of air between the outside conductor and the inside conductor tends to increase, within limits, the efficiency of the electrical system. The cables of the present invention as can be seen in FIGS. 3 and 4 are provided with a sufficient amount of air space which, as suggested heretofore, is highly desirable.

Figure 5:
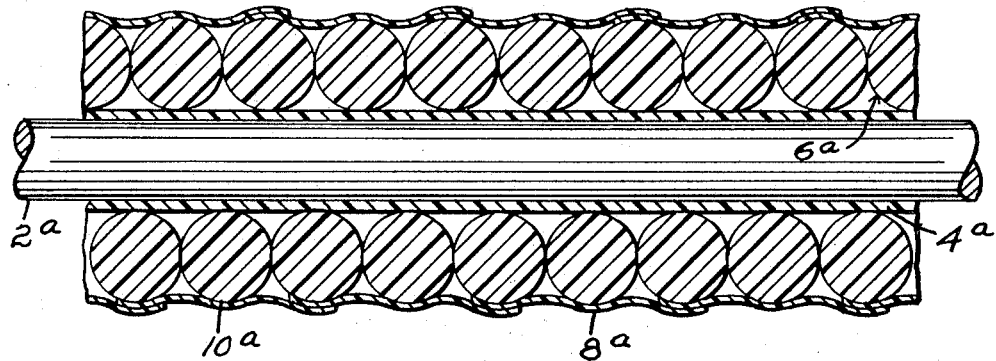
FIG. 5 is a section of the coaxial cable showing the use of tape as an outside wrapping.

The use of a tape wrapping as shown in FIGURE 5, and the various portions of the assembly are provided with a small letter "a" for clarity. All of the procedures as set forth in relation to the disclosure of FIGURES 1 through 3 may also be applied to that of the assembly disclosed in FIGURE 5.

With reference to the foregoing description it is to be understood that what has been disclosed therein represents

I claim:
1. A coaxial cable comprising a central core, a dielectric thread wound about said central core, an outer dielectric coating on said thread, said coating conforming to the outer arcuate surface of said thread thereby providing a series of convolutions and an outer conductor of electrically conductive material deposited over said outer coating, each of the helixes formed when said thread is wound about the central core being spaced for the major portion of its length from the other helixes formed by said thread.

2. A coaxial cable as set forth in claim 1 wherein said thread wound about said central core is formed of a sintered polymeric material and said outer coating being covered by a plating of metallic material capable of carrying an electric current.

References Cited

UNITED STATES PATENTS

| | | | |
|---|---|---|---|
| 2,397,568 | 4/1946 | Seaman | 174—110.6 |
| 2,890,263 | 6/1959 | Brandes et al. | 174—29 |
| 3,105,287 | 10/1963 | Whearley et al. | 174—111 |
| 3,179,739 | 4/1965 | Tiede | 174—120 |
| 3,287,490 | 11/1966 | Wright | 174—102.6 |

FOREIGN PATENTS 921,453 3/1963 Great Britain.

LEWIS H. MYERS, *Primary Examiner.*

A. T. GRIMLEY, *Assistant Examiner.*

U.S. Cl X.R.

174—110